Feb. 18, 1936.                C. A. WINSLOW                2,031,242
                                  ENGINE
                            Filed July 21, 1932           2 Sheets-Sheet 1
Fig. I.
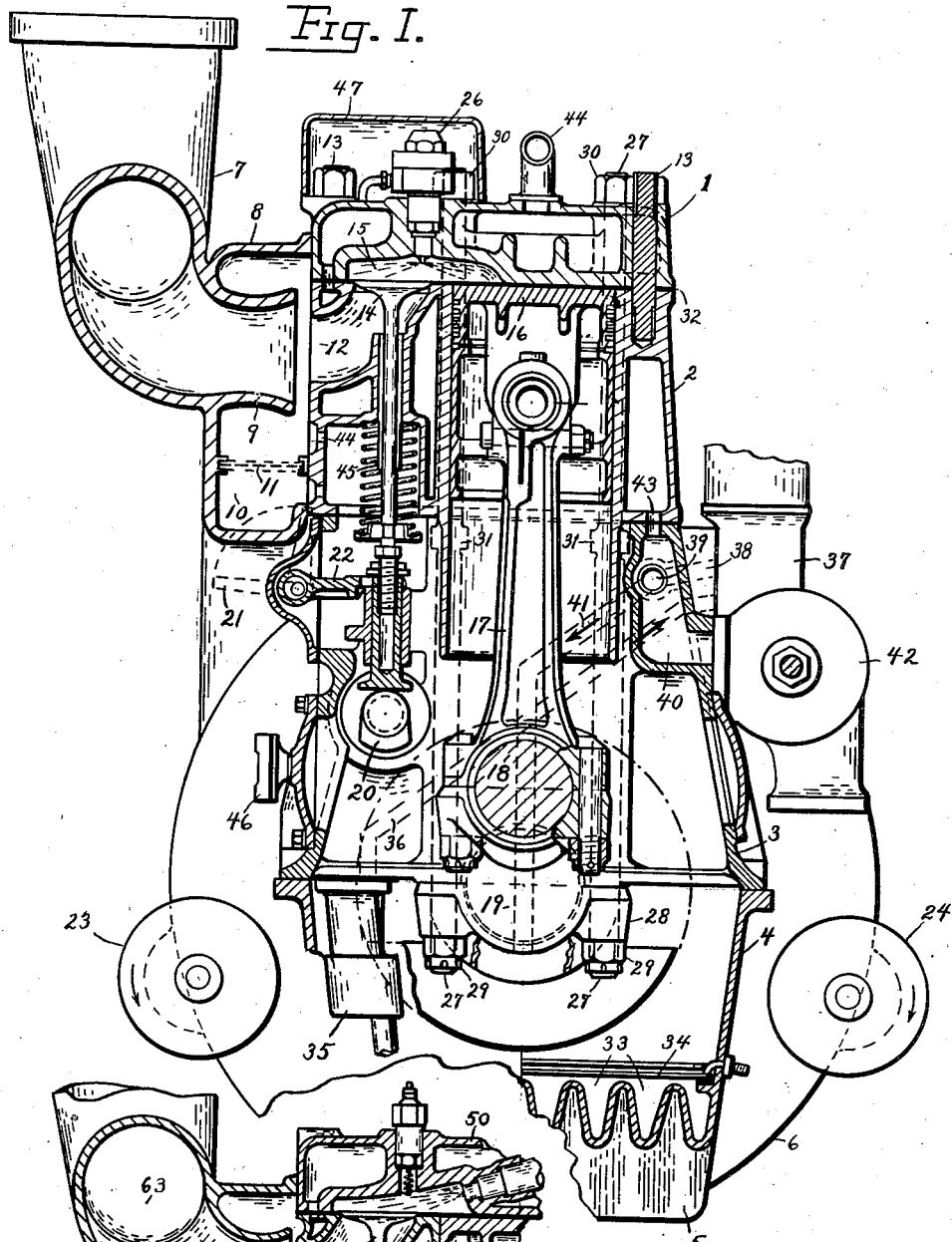
Fig. 2.
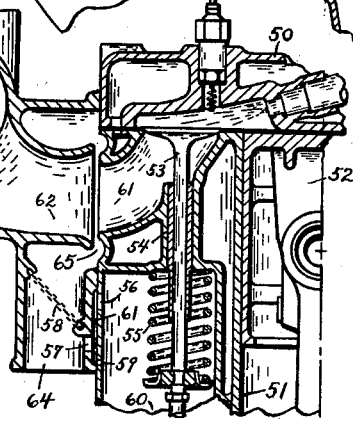
INVENTOR
Charles A. Winslow.

Feb. 18, 1936. C. A. WINSLOW 2,031,242
ENGINE
Filed July 21, 1932 2 Sheets-Sheet 2
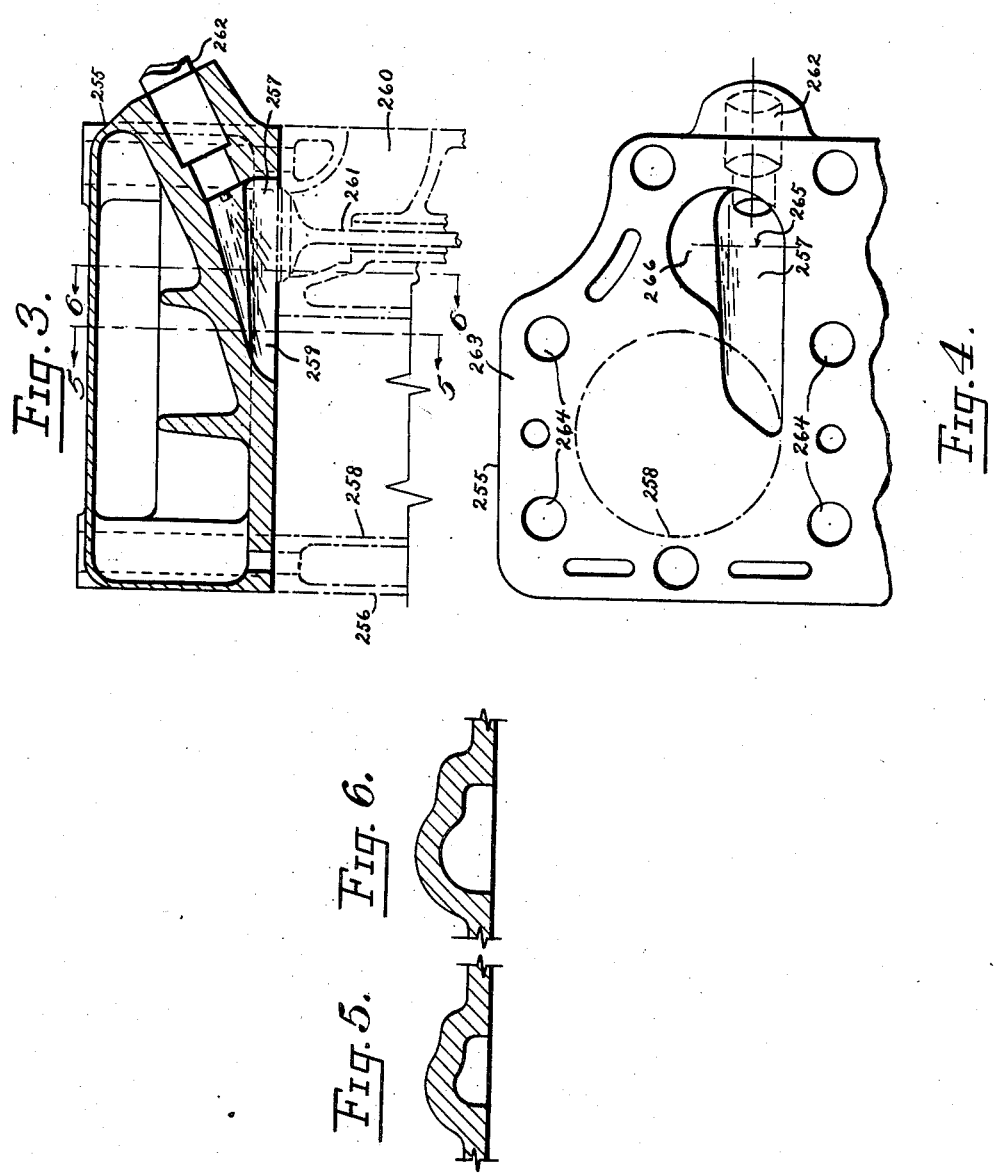
INVENTOR
Charles A. Winslow

Patented Feb. 18, 1936

2,031,242

UNITED STATES PATENT OFFICE 2,031,242

ENGINE

Charles A. Winslow, Oakland, Calif.

Application July 21, 1932, Serial No. 623,769

4 Claims. (Cl. 123—79)

The present invention is an improvement on the structure disclosed in my Patent No. 1,926,077 entitled "Engine" and issued September 12th, 1933, and relates to hydro-carbon engines, particularly of the compression ignition type, and has for its principal object to provide a novel form of combustion chamber and fuel injection system to insure turbulence and better combustion, the simplification of the engine design generally, and novel means of operating a four-cycle engine on heavy fuel, in either direction, with only one valve per cylinder, elimination of all exterior moving parts, simplification of manifolding for the exit of exhaust gases and the induction of fresh air for the air inlet of the engine.

Other objects and advantages will be evident and suggest themselves as the nature of the invention is more clearly understood.

Fig. 1 is a central vertical cross section of the engine, with parts of the engine broken away.

Fig. 2 is a sectional view of a modification of the engine illustrating a modified form of the combustion chamber, valve port, manifold arrangement, and crankcase ventilating means.

Fig. 3, Sheet 2, is a modified form of cylinder head and combustion chamber (which is further illustrated in Fig. 4) in which is shown a combustion chamber adapted for operation with a pintle type nozzle, with fuel injection toward the compressed charge being forced from the cylinder.

Fig. 4 is a bottom view of the head shown in Fig. 3, and further illustrates the form of combustion chamber in which fuel injection takes place toward the turbulent air motion, and also illustrates the method of controlling both a whirling turbulence in the combustion chamber on the compression stroke, and a reverse whirling turbulence in the cylinder on the firing stroke.

Fig. 5 is a sectional view of the above described combustion chamber taken on the line 5—5 of Figs. 3 and 4, looking in the direction of the arrows.

Fig. 6 is another sectional view of same, taken on the line 6—6 of Figs. 3 and 4, and illustrates the cross section of the combustion chamber at that point, also looking in the direction of the arrows.

Referring to Fig. 1 of the drawings, the reference character 1 designates the cylinder head; 2 the cylinder block; 3 the upper crankcase; 4 the lower half of same; 5 the oil pan and cooler; 6 the flywheel housing; 7 the exhaust outlet pipe; 8 the air intake manifold; 9 the exhaust venturi within the air intake manifold; 10 the air inlet below the air filter member 11; 12 is the inlet and outlet port of the engine in communication with the exhaust outlet pipe 7, and the air inlet passage 10.

14 is the engine valve, serving as both intake and exhaust valve. 15 is the combustion chamber, in communication with the port 12 and the bore of the cylinder within the cylinder block 2.

16 is the piston; 17 the connecting rod; 18 the crankpin; and 19 the crankshaft.

The valve 14 is timed through conventional timing gears and operated by cam 20 in a similar manner to the compression ignition engine described in my Patent No. 1,926,077, entitled "Engine" and issued September 12th, 1933. In the present invention a solid injection fuel pump and hydraulically operated nozzles are shown and will be described later.

During operation of the present invention in the form shown in Fig. 1, a compression release lever 21, is moved from an upper to a lower position, as shown in the dotted section. As the lever is moved down a novel compression release means 22, raises the engine valve from its seat.

An electrical starting switch is closed, applying power to either the right or left-handed starter, numbers 23 or 24, depending on the direction of rotation desired. As the engine rotates without compression the fuel pump delivers fuel through the spray valve 26 into the violently turbulent air passing between the cylinder of the engine and the port 12. In operation this turbulence is so violent that any fuel pumped into the engine and sprayed through the valve 26 which is not burned, is blown out through the exhaust manifold 7. The cylinder head 1 is not provided with a pressure relief or safety valve for this reason. Actual practice proves that no harm can be done to the engine due to excess fuel, nor can it be overloaded due to the spray valve pumping fuel in before compression is applied and the engine started. The violent turbulence, as previously stated, blows out all excess fuel until the compression release lever 21 is raised and the valve 14 dropped to its seat for operation of the engine. This turbulence feature also prevents damage to the engine in the event of the valve sticking temporarily during operation, and then dropping to the seat. In other words, the turbulence feature and novel construction prevents an overload of fuel accumulating in the cylinder during operation from any cause whatsoever.

With the compression lever 21 in the upper position, the valve is operated by cam 20; therefore the suction stroke of the piston draws in fresh air from the air intake manifold, compressing same on the compression stroke and forcing practically all of the air from the cylinder into the combustion chamber 15. Approximately 10 to 15 degrees before top dead center, injection of fuel begins through the spray valve 26.

In view of the minimum clearance between the piston crown and the flat lower face of the cylinder head, a violent turbulence occurs on the last upward movement of the piston, as the highly compressed and heated air is forced from the cylinder into the combustion chamber 15. Therefore, this turbulence thoroughly mixes the compressed charge with the injected spray.

With the charge compressed and burning in a violently turbulent state in the combustion chamber 15, the piston is forced down on the power stroke, causing a second violent turbulence to occur when the compressed and burning charge is expanded from the combustion chamber 15, back into the cylinder as the piston moves down on the power stroke.

From the above it will be evident that a primary and secondary turbulence occurs with each power stroke of the engine. On the up stroke the compressed and burning charge is forced past the injection nozzle toward the valve, and on the down power stroke the compressed and burning charge is again forced past the injection nozzle toward the cylinder. The degree of turbulence can be controlled to insure the maximum efficiency of operation.

Various modifications of the cylinder head and combustion chamber, spray valve position, etc. can be made to adapt the engine to various power requirements, involving different manifolding compression ratios, nozzle arrangements, and degrees of turbulence for speed or torque requirements. Some of these modifications are further described in Figs. 3, 4, 5 and 6.

Another important feature of the novel construction of the engine is the thru-bolts 27. These bolts pass completely through the engine, being tight in the crank case 3, and free in the cylinder block 2, the head 1, and the main bearing caps 28. They are provided with nuts, 29 and 30, on opposite ends thereof. They are also provided with an enlarged cam shaped section 31, fitting snugly into a cast section in the crankcase 3. The cam 31 prevents rotation of the bolt 27, while the nuts 29 and 30 are being tightened against the bearing cap 28 and the head 1.

The bolts 27 thereby serve as a means of tying the complete engine structure together from the head to the crankshaft and lower main bearing caps; also important—serve as a means of relieving the engine structure generally of excess cylinder pressures. In other words, when pressure is generated above the piston and within the cylinder, combustion chamber and valve pocket, it operates against the lower face of the cylinder head 1, and against the crankshaft 19, through the connecting rod 17. The cylinder head 1 is held down by the bolts 27 and nuts 30. The crankshaft 19 is held up by the bolts 27 and bearing caps 28 through the medium of the nuts 29. Thus, when cylinder pressures are exerted, the load is principally carried against the main bearing caps 28 and against the lower face of the cylinder head 1. Additional bolts 13 are provided in the cylinder block 2, holding down the head 1, and a few in the cylinder block 2 which are fastened into the crankcase 3. These however, are incidental to the purpose of the thru-bolts 27, which carry the main load of the cylinder pressure and operating stresses. Thus, it will be understood that the working pressures of the engine are transmitted from the cylinder proper to the cylinder head and the main bearing caps, which are tied together with the bolts 27. In the event of extra cylinder pressures, due to abnormal conditions, such as cranking the engine by hand, for some considerable period and deliberately loading up the cylinder and combustion chamber without turbulence, or such as priming the engine with gasoline, etc.,—excess abnormal pressures which may be generated within the cylinder are prevented from wrecking the head or structural parts, due to the length of the bolts 27, and their material being of such a nature that in an emergency it is possible to stretch these bolts and slightly spring the cylinder head 1, relieving such pressure out between the cylinder head and gasket member 32, provided between the head 1 and the cylinder block 2. This gasket 32 is preferably a flat solid copper gasket and is not harmed by the temporary release of the pressure at the gasket between the head 1 and the cylinder block 2. During normal operation no pressure will be relieved at this point. However, during abnormal operation— such as priming with gasoline, etc. as previously described, this means is provided for preventing damage to the engine structure generally. On resumption of normal operation the spring in the bolts insures a renewal of the tight-fitting condition between the head 1 and the cylinder block 2. This general construction also provides the minimum amount of metal and compactness of design for the maximum displacement and horsepower output, with a minimum overall height and width for the engine.

Due to the L-head construction of the engine and the fact that it has only one valve per cylinder, ample room is provided for the installation of the fuel injection pump, piping, etc.,—all of which are contained within the outside wall of the engine proper.

The manifolding is simplified, due to this construction and eliminates the necessity of separate intake and exhaust manifolds.

A modified form of combustion chamber is illustrated in Fig. 2 in which the injection nozzle is located in such a manner that injection takes place toward the valve end of the combustion chamber and flows with the turbulent, heated air charge rushing from the cylinder 51 on the compression stroke of the engine. This combustion chamber is so designed that a pintle type, or open-end nozzle could be used to an advantage, as the inrushing air is caused to spin within the combustion chamber with a circular motion on the compression stroke and exhaust from the combustion chamber with a reverse circular motion on the expansion stroke. This turbulence feature is further described and illustrated in Figs. 4 and 5.

During operation of the engine, with the manifold design shown in Fig. 2, the exhaust inertia causes a partial vacuum to occur at the air inlet 64. This air rushes in through the air cleaner member 58, and follows the exhaust gases into the pipe 63. At the top of the exhaust stroke the piston 52 completes its function of forcing out the exhaust gases and descends on the suction stroke, causing a partial vacuum to occur at the inlet port 61. Instantly the air which followed the exhaust gases, is caused to rebound. The slight back-pressure of the exhaust aids in this function, and as the air rushes in to fill the vacuum in the port 61 and the cylinder 51, it has considerable inertia, which aids in drawing still more fresh air through the port 65. Thus the cylinder is completely filled with fresh air and the exhaust gases are carried out through the pipe 63 by their own inertia. The form of the exhaust port 61, passages 65, and the shape of the Venturi member 62, aid in this function.

In Fig. 3, 255 is the head, 256 the cylinder block, 257 the combustion chamber, 258 the cylinder, 259 the throat, or passage between the combustion chamber 257 and the cylinder 258; 260 is the valve port and 261 the engine valve; 262 is a pintle type nozzle, illustrated as being adaptable to inject into the combustion chamber toward the turbulent compressed and heated air mixture rushing from the cylinder on compression stroke and adapted to flow with the burning mixture toward the cylinder on expansion stroke. In this case the spray jet is folded back and the flame is spun in the combustion chamber on the upward movement of the piston and a reverse turbulence is created in the cylinder 258 on the downward movement of the piston. A compact spray chamber is also provided by this novel construction.

In Fig. 4, this is further illustrated, in which 263 is the lower flat portion of the cylinder head 255; 258 designates the cylinder bore outlined; 257 the combustion chamber; 262 the injection nozzle location, and 264 the thru-bolt holes, which are used to pass the thru-bolts 27, previously described. It is to be noted in this view that a deep portion of the head at 265 is shown in line with the injection nozzle and a relatively lower portion at 266, located over the valve. This is further shown in Fig. 5 taken on the line 5—5 of both Figs. 3 and 4. It is still further illustrated in Fig. 6, which is taken on the line 6—6 of Figs. 3 and 4. From this description it is to be understood that the raised portion of the cylinder head tapers downwardly from the upper edge of the nozzle, toward the cylinder, with an incline from the nozzle to the lower face of the cylinder. This shape is ideally adapted to fit the spray from a pintle type nozzle, as previously mentioned.

While I have herein described in some detail specific forms and various features of my invention, which I deem to be new and advantageous and may specifically claim, I do not desire it to be understood that my invention is limited to the exact details of the construction or forms shown, as it will be apparent that changes may be made therein without departing from the spirit or scope of my invention.

Having thus described my invention, what I claim is:

1. In an L-head engine, a cylinder block including a cylinder, a piston, a valve and valve port, a cylinder head containing a combustion chamber covering said valve and overlapping the bore of said cylinder, said combustion chamber being elongated and tangentially disposed with relation to the cylinder and having a cross sectional shape which decreases in area both vertically and horizontally toward the cylinder and forming an open communication between the valve port and cylinder during each opening of the valve, and a fuel injection nozzle positioned above the valve and discharging fuel in a direction longitudinally of the combustion chamber.

2. In an internal combustion engine a cylinder block having a cylinder bore formed therein and a common exhaust and inlet passage, said passage being disposed at one side of the cylinder, a cylinder head closing the cylinder chamber and the common passage, a combustion chamber formed in the cylinder head and establishing communication between the cylinder and said common passage, a single valve in said cylinder block for controlling flow through said common passage, and a fuel injector in said head adapted to discharge fuel longitudinally of the combustion chamber toward the cylinder and in a direction tangential to said cylinder.

3. In an internal combustion engine a cylinder block having a cylinder chamber formed therein and a common passage at one side of the cylinder for the admission of air and the discharge of exhaust gases, a single valve controlling flow through said common passage, a head on the cylinder block and having a combustion chamber formed therein, said chamber being disposed above the valve, a contracted passage formed in the head between the combustion chamber and the cylinder and tangentially disposed with relation to the combustion chamber to impart a turbulent whirl to air entering the combustion chamber from the cylinder, and a fuel injection nozzle in the combustion chamber in a position to inject fuel into the combustion chamber in the direction of the contracted tangentially disposed passage.

4. In a single valve L-head four-cycle compression ignition engine, a cylinder, a piston, a head covering the cylinder, a single valve for inlet and exhaust, a combustion chamber of circular formation overlying the single valve, said chamber having an elongated extension forming communication between the cylinder and the combustion chamber and said elongation being tangentially disposed with relation to the circular shaped combustion chamber, and said elongated portion of the combustion chamber having a cross section which decreases in area both vertically and horizontally toward the cylinder, and means for injecting fuel into the combustion chamber in the direction of the longitudinal axis of the elongated portion of the combustion chamber.

CHARLES A. WINSLOW.